United States Patent
Bradbury et al.

(10) Patent No.: US 6,586,372 B1
(45) Date of Patent: Jul. 1, 2003

(54) ADDITIVE FOR INCREASING THE DENSITY OF A FLUID AND FLUID COMPRISING SUCH ADDITIVE

(75) Inventors: Andrew Bradbury, St. Austell (GB); Christopher A. Sawdon, Par (GB)

(73) Assignee: M-I LLC., Houston, TX (US)

( * ) Notice: Subject to any disclaimer, the term of this patent is extended or adjusted under 35 U.S.C. 154(b) by 0 days.

(21) Appl. No.: 09/230,302
(22) PCT Filed: Jul. 16, 1997
(86) PCT No.: PCT/EP97/03802
§ 371 (c)(1), (2), (4) Date: Sep. 10, 1999
(87) PCT Pub. No.: WO98/03609
PCT Pub. Date: Jan. 29, 1998

(30) Foreign Application Priority Data

Jul. 24, 1996 (GB) .............................. 9615549

(51) Int. Cl.[7] .......................... C09K 7/06; C09K 7/00
(52) U.S. Cl. ................. 507/140; 507/100; 507/200; 507/269; 507/906; 507/128; 507/135; 507/138; 507/235; 507/259; 507/265
(58) Field of Search ................................. 507/100, 200, 507/140, 269, 906, 128, 135, 138, 235, 259, 265

(56) References Cited

U.S. PATENT DOCUMENTS

| | | | | | |
|---|---|---|---|---|---|
| 2,003,701 | A | * | 6/1935 | Stinson | 507/100 |
| 2,830,948 | A | * | 4/1958 | Popham | 507/140 |
| 3,408,296 | A | * | 10/1968 | Kuhn | 507/906 |
| 4,230,586 | A | | 10/1980 | Bretz et al. | |
| 4,664,841 | A | * | 5/1987 | Kitahara et al. | 252/309 |
| 5,415,228 | A | * | 5/1995 | Price et al. | 507/906 |
| 5,504,062 | A | * | 4/1996 | Johnson | 507/140 |
| 5,518,996 | A | * | 5/1996 | Maroy et al. | 507/100 |
| 5,792,727 | A | * | 8/1998 | Jacobs | 507/140 |
| 5,826,669 | A | * | 10/1998 | Zaleski et al. | 507/140 |
| 5,910,467 | A | * | 6/1999 | Bragg | 507/906 |
| 5,948,733 | A | * | 9/1999 | Cawiezel et al. | 507/906 |
| 6,025,303 | A | * | 2/2000 | Keilhofer et al. | 507/140 |
| 6,153,562 | A | * | 11/2000 | Villar et al. | 507/269 |
| 6,248,698 | B1 | * | 6/2001 | Mullen et al. | 507/140 |

FOREIGN PATENT DOCUMENTS

| | | | | |
|---|---|---|---|---|
| EP | 119745 | * | 9/1984 | |
| EP | 0621330 | | 10/1994 | ............ C09K/7/04 |
| EP | 0673985 | | 9/1995 | ............ C09K/7/02 |
| EP | 0786507 | A1 | 7/1997 | ............ C09K/7/02 |
| GB | 1472701 | * | 5/1977 | |

OTHER PUBLICATIONS

Ormsby, George S., "Understanding Solids Control Improves Drilling Efficiency," *Petroleum Engineer International*, Dec. 1981, pp. 120–130.

Rogers, Walter F., et al., "Composition and Properties of Oil Well Drilling Fluids," Fourth Edition, Gulf Coast Publishing Co., 1980, pp. 8–11.

Rogers, Walter F., "Composition and Properties of Oil Well Drilling Fluids," Revised Edition, Gulf Coast Publishing Co., 1953, pp. 148–151.

(List continued on next page.)

*Primary Examiner*—Philip Tucker
(74) *Attorney, Agent, or Firm*—Stephen H. Cagle; Carter J. White; Howrey Simon Arnold & White LLP

(57) ABSTRACT

An additive which increases the density of wellbore fluids used during the construction or repair of oil, gas, injection, water or geothermal wells comprises solid colloidal particles of weight average particle diameter ($D_{50}$) of less than 2 microns, the particles being deflocculated by the action of a dispersant, preferably incorporated during the process of grinding or communication of the particles to the specified particle size. The additives may be used in any wellbore fluid such as drilling, cementing, completion, packing, work-over (repairing), stimulation, well killing and spacer fluids as well as in a dense media separating fluid or in a ship's ballast fluid.

6 Claims, 1 Drawing Sheet

OTHER PUBLICATIONS

Malachosky, Ed, "Hematite Adds Weight to Fluid Additive Controversy," *Petroleum Engineer International*, Jul. 1986, pp. 40–43.

Walker, C.O., "Alternative Weighting Material," *Journal of Petroleum Technology*, Dec. 1983, pp. 2158–2164.

Mohnot, Shantilal M., "Characterization and Control of Fine Particles Involved in Drilling," *Journal of Petroleum Technology*, Sep. 1985, pp. 1622–1632.

Hayatdavoudi, A., "Drilling With a One–Step Solids–Control Technique," *SPE Drilling Engineering*, Mar. 1989, pp. 31–40.

"Decanting Centrifuges and Weighted Water Base Muds," Technical Bulletin, Geolograph Pioneer, pp. 111–122, No Date Available.

"Recommended Practice Standard Procedure for Laboratory Testing Drilling Fluids," API Recommended Practice 131, Fifth Edition, Jun. 1, 1995, pp. 6–7.

API Committee RP 13A Report, 1984, p. 19.

API Task Group On Barite Report, 1985, pp. 23–25.

* cited by examiner

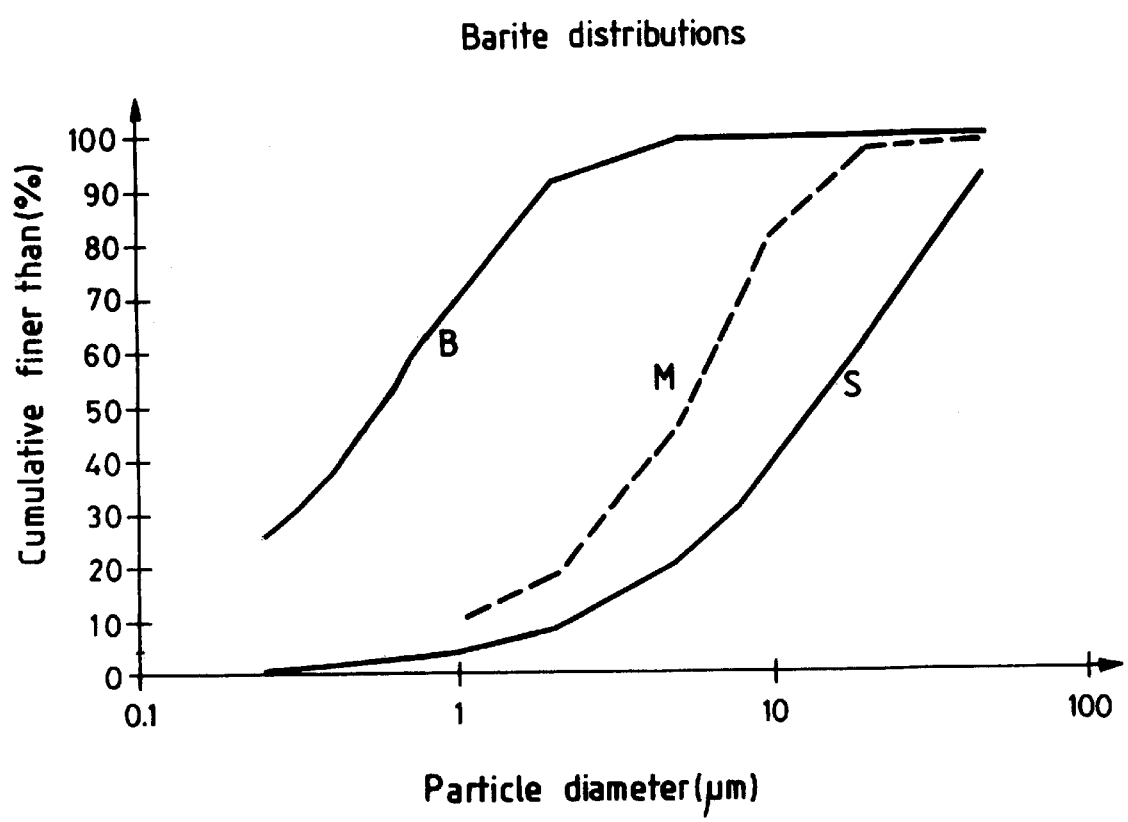

ADDITIVE FOR INCREASING THE DENSITY OF A FLUID AND FLUID COMPRISING SUCH ADDITIVE

This invention relates to products which increase the density of wellbore fluids used during the construction or repair of oil, gas, injection, water or geothermal wells. The products of this invention may be used in any wellbore fluid such as drilling, cementing, completion, packing, work-over (repairing), stimulation, well killing, and spacer fluids.

One of the most important functions of a wellbore fluid is to contribute to the stability of the well bore, and control the flow of gas, oil or water from the pores of the formation in order to prevent, for example, the flow or blow out of formation fluids or the collapse of pressured earth formations. The column of fluid in the hole exerts a hydrostatic pressure proportional to the depth of the hole and the density of the fluid. High pressure formations may require a fluid with a specific gravity of up to 3.0.

A variety of materials are presently used to increase the density of wellbore fluids. These include dissolved salts such as sodium chloride, calcium chloride and calcium bromide. Alternatively powdered minerals such as barytes, calcite and hematite are added to a fluid to form a suspension of increased density. It is also known to utilise finely divided metal such as iron as a weight material. In this connection, PCT Patent Application WO85/05118 discloses a drilling fluid where the weight material includes iron/steel ball-shaped particles having a diameter less than 250 $\mu$m and preferentially between 15 and 75 $\mu$m. It has also been proposed to use calcium or iron carbonate (see for example U.S. Pat. No. 4,217,229).

It is a requirement of wellbore fluids that the particles form a stable suspension, and do not readily settle out. A second requirement is that the suspension should exhibit a low viscosity in order to facilitate pumping and to minimise the generation of high pressures. Another requirement is that the wellbore fluid slurry should exhibit low filtration rates (fluid loss).

Conventional weighting agents such as powdered barytes ("barite") exhibit an average particle diameter ($d_{50}$) in the range of 10–30 $\mu$m. To suspend these materials adequately requires the addition of a gellant such as bentonite for water based fluids, or organically modified bentonite for oil based fluids. A soluble polymer viscosifier such as xanthan gum may be also added to slow the rate of the sedimentation of the weighting agent. However, a penalty is paid in that as more gellant is added to increase the suspension stability, the fluid viscosity (plastic viscosity) increases undesirably resulting in reduced pumpability. This is obviously also the case if a viscosifier is used.

The sedimentation (or "sag") of particulate weighting agents becomes more critical in wellbores drilled at high angles from the vertical, in that sag of, for example, one inch (2.54 cm) can result in a continuous column of reduced density fluid along the upper portion of the wellbore wall. Such high angle wells are frequently drilled over large distances in order to access, for example, remote portions of an oil reservoir. In this case it becomes even more critical to minimise a drilling fluid's plastic viscosity in order to reduce the pressure losses over the borehole length.

This is no less important in deep high pressure wells where high density wellbore fluids are required. High viscosities can result in an increase in pressure at the bottom of the hole under pumping conditions. This increase in "Equivalent Circulating Density" can result in opening fractures in the formation, and serious losses of the wellbore fluid. Again, however, the stability of the suspension is important in order to maintain the hydrostatic head to avoid a blow out. The two objectives of low viscosity plus minimal sag of weighting material can be difficult to reconcile.

The need therefore exists for materials to increase fluid density which simultaneously provide improved suspension stability and less viscosity increase.

It is known that reduced particle sedimentation rates can be obtained by reducing the particle size used.

However, the conventional view in the drilling industry is that reducing the particle size causes an undesirable increase in viscosity. This is supposed to be caused by an increase in the surface area of the particles causing increased adsorption of water.

For example, "Drilling and Drilling Fluids" Chilingarian G. V. and Vorabutor P. 1981, pages 441–444 states: "The difference in results (i.e. increase in plastic viscosity) when particle size is varied in a mud slurry is primarily due to magnitude of the surface area, which determines the degree of adsorption (tying up) of water. More water is adsorbed with increasing area." Further it is also stated that "Viscosity considerations often will not permit the addition of any more of the colloidal solids necessary to control filtration, unless the total solids surface area is first reduced by removing a portion of the existing clays". The main thrust of the argument is that colloidal fines due to their nature of having a high surface area to volume ratio will adsorb significantly more water and so decrease the fluidity of the mud. This is why they and others have recommended that it is necessary in weighted particulate muds to remove the fine solids to reduce viscosity. The same argument or concept is presented in "Drilling Practices Manual" edited by Moore pages 185–189 (1986). Also, the API specification for barite as a drilling fluid additive limits the % w/w below 6 $\mu$m to 30% maximum in order to minimise viscosity increases.

It is therefore very surprising that the products of this invention, which comprise particles very finely ground to an average particle diameter ($d_{50}$) of less than two $\mu$mmicrons, provide wellbore fluids of reduced plastic viscosity whilst greatly reducing sedimentation or sag.

The additives of this invention comprise dispersed solid colloidal particles with a weight average particle diameter ($d_{50}$) of less than 2 $\mu$m and a deflocculating agent or dispersant. The fine particle size will generate suspensions or slurries that will show a reduced tendency to sediment or sag, whilst the dispersant controlling the inter-particle interactions will produce lower rheological profiles. It is the combination of fine particle size and control of colloidal interactions that reconciles the two objectives of lower viscosity and minimal sag.

It is worth noting that small particles have already been used in drilling fluids but for a totally different purpose. Thus, EP-A-119 745 describes an ultra high density fluid for blow-out prevention comprised of water, a first and possibly second weighting agent and a gellant made of fine particles (average diameter from 0.5 to 10 $\mu$m). The gelling agent particles are small enough to impart a good static gel strength to the fluid by virtue of the interparticle attractive forces. On the contrary, the present invention makes use of well dispersed particles: the interparticle forces tend to push away the other particles. If the concentration of small dispersed particles is sufficient, no gelling agent is needed.

According to the invention, a dispersant is added to the particulate weighting additive to allow it to find an acceptable conformation on the particle surface. This provides via a manipulation of the colloidal interactions rheological control, tolerance to contaminants and manipulation of the colloidal interactions rheological control, tolerance to contaminants and enhanced fluid loss (filtration) properties. In the absence of the dispersant a concentrated slurry of these small particles, would be an unpumpable paste or gel. According to a preferred embodiment of the present invention, the dispersant is added during the grinding or comminution process. This provides an advantageous improvement in the state of dispersion of the particles compared to post addition of the dispersant to fine particles. The presence of the dispersant in the comminution process yields discrete particles which can form a more efficiently packed filter cake and so advantageously reduce filtration rates.

According to a preferred embodiment, the dispersant is chosen so as it provides the suitable colloidal inter-particle interaction mechanism to make it tolerant to a range of common wellbore contaminants, including salt saturated.

According to a preferred embodiment of the present invention, the weighting agent of the present invention is formed of particles that are composed of a material of specific gravity of at least 2.68. This allows wellbore fluids to be formulated to meet most density requirements yet have a particulate volume fraction low enough for the fluid to be pumpable.

A preferred embodiment of this invention is for the weight average particle diameter ($d_{50}$) of the new weighting agent to be less than 1.5 micron. This well enhance the suspension's characteristics in terms of sedimentation or sag stability without the viscosity of the fluid increasing so as to make it unpumpable.

A method of comminuting a solid material to obtain material containing at least 60% by weight of particles smaller than 2 $\mu$m is known for example from British Patent Specification No 1,472,701 or No 1,599,632. The mineral in an aqueous suspension is mixed with a dispersing agent and then ground within an agitated fluidised bed of a particulate grinding medium for a time sufficient to provide the required particle size distribution. An important preferred embodiment aspect of the present invention is the presence of the dispersing agent in the step of "wet" grinding the mineral. This prevents new crystal surfaces formed during the comminution step from forming agglomerates which are not so readily broken down if they are subsequently treated with a dispersing agent.

The colloidal particles according the invention may be provided as a concentrated slurry either in an aqueous medium or an organic liquid. In the latter case, the organic liquid should have a kinematic viscosity of less than 10 centistokes at 40° C. and, for safety reasons, a flash point of greater than 60° C. Suitable organic liquids are for example diesel oil, mineral or white oils, n-alkanes or synthetic oils such as alpha-olefin oils, ester oils or poly(alpha-olefins).

Where the colloidal particles are provided in an aqueous medium, the dispersing agent may be, or example, a water soluble polymer of molecular weight of at least 2,000 Daltons. The polymer is a homopolymer or copolymer of any monomers selected from (but not limited to) the class comprising: acrylic acid, itaconic acid, maleic acid or anhydride, hydroxypropyl acrylate vinylsulphonic acid, acrylamido 2-propane sulphonic acid, acrylamide, styrene sulphonic acid, acrylic phosphate esters, methyl vinyl ether and vinyl acetate. The acid monomers may also be neutralised to a salt such as the sodium salt.

It is known that high molecular weight polymers act as flocculants by bridging between particles while low molecular weight polymers for instance (less than 10,000) act as deflocculants by creating overall negative charges.

It has been found that when the dispersing agent is added while grinding, intermediate molecular weight polymers (in the range 10,000 to 200,000 for example) may be used effectively. Intermediate molecular weights dispersing agents are advantageously less sensitive to contaminants such as salt and therefore are well adapted to wellbore fluids.

Where the colloidal particles are provided in an organic medium, the dispersing agent may be selected for example among carboxylic acids of molecular weight of at least 150 such as oleic acid and polybasic fatty acids, alkylbenzene sulphonic acids, alkane sulphonic acids, linear alpha-olefin sulphonic acid or the alkaline earth metal salts of any of the above acids, phospholipids such as lecithin, synthetic polymers such as Hypermer OM-1 (trademark of ICI).

The colloidal particles comprise one or more materials selected from but not limited to barium sulphate (barite), calcium carbonate, dolomite, ilmenite, hermatite or other iron ores, olivine, siderite, strontium sulphate. Normally the lowest wellbore fluid viscosity at any particular density is obtained by using the highest density colloidal particles. However other considerations may influence the choice of product such as cost, local availability and the power required for grinding.

Calcium carbonate and dolomite posses the advantage that residual solids or filter cake may be readily removed from a well by treatment with acids.

This invention has a surprising variety of applications in drilling fluids, cement, high density fluids and coiled tubing drilling fluids to highlight a few. The new particulate weighting agents have the ability to stablise the laminar flow regime, and delay the onset of turbulence. It is possible to formulate fluids for several applications including coiled tubing drilling fluids, that will be able to be pumped faster before turbulence is encountered, so giving essentially lower pressure drops at equivalent flow rates. This ability to stabilise the laminar flow regime although surprising, is adequately demonstrated in heavy density muds of 20 pounds per gallon (2.39 g/cm$^3$) or higher. Such high density muds using conventional weighting agents with a weight average particle diameter of 10 to 30 $\mu$m would exhibit dilatancy with the concomitant increase in the presence drops due to the turbulence generated. The ability of the new weighting agent to stabilise the flow regime even in the presence of a component of larger particles, means that high density fluids with acceptable rheology are feasible with lower pressure drops.

A further and unexpected application occurs in cement whereby the new weighting agent will generate slurries of a more controlled and lower rheology so allowing it to be pumped more freely into position. The reduced particle size will tend to have a less abrasive nature, whilst its suspension characteristics will reduce the free water and other suspension issues encountered when setting the cement. The high fraction of fines should also act as efficient fluid loss control agents, so preventing gas migration and producing stronger cements.

The fluids of the present invention may also be used in non-oilfield applications such as dense media separating fluid (to recover ore for example) or as a ship's ballast fluid.

The following examples are to illustrate the properties and performance of the wellbore fluids of the present invention though the invention is not limited to the specific embodiments showing these examples. All testing was conducted as per API RP 13 B where applicable. Mixing was performed on Silverso L2R or Hamilton Beach Mixers. The viscosity at various shear rates (RPM's) and other rheological properties were obtained using a Fann viscometer. Mud weight were checked using a standard mud scale or an analytical balance. Fluid loss was measured with a saturated API fluid loss cell.

In expressing a metric equivalent, the following U.S. to metric conversion factors are used: 1 gal=3.785 liters; 1 lb.=0.454 kg; 1 lb./gal (ppg)=0.1198 g/cm$^3$; 1 bbl=42 gal; 1 lb./bbl (ppb)=2.835 kg/m$^3$; 1 lb/100 ft$^2$=0.4788 Pa.

These tests have been carried out with different grades of barite: a standard grade of API barite, having a weight average particle diameter ($D_{50}$) of about 20 $\mu$m; a commercial barite (M) made by milling/grinding barite whilst in the dry state, with an average size of $3\mu$–$5\mu$ and colloidal barite according the present invention (with a $D_{50}$ from 0.5 $\mu$m to 1.5 $\mu$m), with a dipsersant included during the "wet" grinding process. The corresponding particle size distributions are shown FIG. 1. The dispersant is IDSPERSE™ XT (Mark of Schlumberger), an anionic acrylic ter-polymer of molecular weight in the range 40,000–120,000 with carboxylate and other functional groups. This preferred polymer is advantageously stable at temperature up to 200° C., tolerant to a broad range of contaminant, gives good filtration properties and do not readily desorb off the particle surface.

EXAMPLE 1

22 ppg [2.63 g/cm$^3$] fluids based on barium sulphate and water were prepared using standard barite and colloidal barite according to the invention. The 22 ppg slurry of API grade barite and water was made with no gelling agent to control the inter-particle interactions (Fluid #1). Fluid #2 is also based on standard barite but with a post-addition of two pounds per barrel (5.7 kilograms per cubic meter) IDSPERSE XT. Fluid #3 is 100% new weighting agent with 67% of particles below 1 micron in size and at least 90% less than 2 $\mu$m. The results are provided in table I.

TABLE I

| # | Viscosity at various shear rates (rpm of agitation): Dial reading or "Fann Units" for: | | | | | | Plastic Viscosity mPa.S | Yield Point lb/100 ft$^2$ (Pascals) |
|---|---|---|---|---|---|---|---|---|
|   | 600 rpm | 300 rpm | 200 rpm | 100 rpm | 6 rpm | 3 rpm | | |
| 1 | 250 | 160 | 124 | 92 | 25 | 16 | 90 | 70 (34) |
| 2 | 265 | 105 | 64 | 26 | 1 | 1 | 160 | −55 (−26) |
| 3 | 65 | 38 | 27 | 17 | 3 | 2 | 27 | 11 (5) |

For Fluid #1 the viscosity is very high and the slurry was observed to filter very rapidly. (If further materials were added to reduce the fluid loss, the viscosity would increase yet further). This system sags significantly over one hour giving substantial free water (ca. 10% of original volume).

Post addition of two pounds per barrel [5.7 kg/cm$^3$] of IDSPERSE XT to this system (Fluid #2) reduces the low shear rate viscosity by controlling the inter-particle interactions. However due to the particle concentration and average particle size the fluid exhibits dilatency which is indicated by the high plastic viscosity and negative yield point. This has considerable consequences on the pressure drops for these fluids whilst pumping. The fluid #2 sags immediately on standing.

By contrast, Fluid #3 exhibits an excellent, low, plastic viscosity. The presence of the dispersing polymer controls the inter-particle interactions, so making fluid #3 pumpable and not a gel. Also the much lower average particle size has stabilised the flow regime and is now laminar at 1000 s$^{-1}$ demonstrated by the low plastic viscosity and positive yield point.

EXAMPLE 2

Experiments were conducted to examine the effect of the post addition of the chosen polyemr dispersant to a slurry comprising weighting agents of the same colloidal particle size. A milled barite ($D_{54}$-4 um) and a comminuted Calcium carbonate (70% by weight of the particles of less than 2 $\mu$m) were selected, both of which are of similar particle size to the invention related herein. The slurries were prepared at an equivalent particle volume fraction of 0.282. See table II.

The rheologies were measured at 120° F. (49° C.) thereafter an addition of 6 ppb (17.2 kg/m$^3$) IDSPERSE XT was made. The rheologies of the subsequent slurries were finally measured at 120° F. (see table III) with additional API fluid loss test.

TABLE II

| # | Material | Dispersant | Density (ppg) | Volume Fraction | wt/wt |
|---|---|---|---|---|---|
| 4 | New Barite | while grinding | 16.0 [1.92 g/cm$^3$] | 0.282 | 0.625 |
| 5 | Milled Barite | none | 16.0 [1.92 g/cm$^3$] | 0.282 | 0.625 |
| 6 | Milled Barite | post-addition | 16.0 [1.92 g/cm$^3$] | 0.282 | 0.625 |
| 7 | Calcium Carbonate | none | 12.4 [1.48 g/cm$^3$] | 0.282 | 0.518 |
| 8 | Calcium Carbonate | post-addition | 12.4 [1.48 g/cm$^3$] | 0.282 | 0.518 |

TABLE III

| # | Viscosity at various shear rates (rpm of agitation): Dial reading or "Fann Units" for: | | | | | | Plastic Viscosity mPa.s | Yield Point lb/100 ft$^2$ | API Fluid Loss |
|---|---|---|---|---|---|---|---|---|---|
|   | 600 rpm | 300 rpm | 200 rpm | 100 rpm | 6 rpm | 3 rpm | | | |
| 4 | 12 | 6 | 4 | 2 | | | 6 | 0 | 11 |
| 5 | os | os | os | os | os | os | | | |
| 6 | 12 | 6 | 4 | 2 | | | 6 | 0 | total[1] |
| 7 | os | os | 260 | 221 | 88 | 78 | | | |
| 8 | 12 | 6 | 4 | 3 | 1 | 1 | 6 | 0 | total[2] |

[1]- total fluid loss in 26 minutes
[2]- total fluid loss in 20 minutes

No filtration control is gained from post addition of the polymer as revealed by the total fluid loss in the API test.

EXAMPLE 3

This test was carried out to show the feasibility of 24 ppg [2.47 g/cm$^3$] slurries (0.577 Volume fraction). Each fluid contained the following components e.g. Fresh Water 135.4 g, Total Barite 861.0 g, IDSPERSE XT 18.0 g. The barite component was varied in composition according to the following table.

TABLE IV

| # | API grade Barite (%) | Colloidal Barite (%) |
|---|---|---|
| 9 | 100 | 0 |
| 10 | 90 | 10 |
| 11 | 80 | 20 |
| 12 | 75 | 25 |
| 13 | 60 | 40 |
| 14 | 0 | 100 |

TABLE V

| | Viscosity at various shear rates (rpm of agitation) : Dial reading or "Fann Units" for: | | | | | | | | Plastic Viscosity | Yield Point lb/100 ft$^2$ |
|---|---|---|---|---|---|---|---|---|---|---|
| # | 600 | 300 | 200 | 117 | 100 | 59 | 30 | 6 | 3 | mPa.s | (Pascals) |
| 9 | *os | 285 | 157 | 66 | 56 | 26 | 10 | 3 | 2 | | |
| 10 | 245 | 109 | 67 | 35 | 16 | 13 | 7 | 3 | 2 | 136 | −27 (−13) |
| 11 | 171 | 78 | 50 | 28 | 23 | 10 | 7 | 3 | 2 | 93 | −15 (−7) |
| 12 | 115 | 55 | 36 | 19 | 17 | 8 | 5 | 3 | 2 | 60 | −5 (−2) |
| 13 | 98 | 49 | 34 | 21 | 20 | 14 | 10 | 4 | 3 | 49 | 0 |
| 14 | 165 | 84 | 58 | 37 | 32 | 22 | 18 | 5 | 3 | 81 | 3 (−1.5) |

*os = off-scale

The results provided table V show that API grade barite due to its particle size and the high volume fraction required to achieved high mud weights exhibit dilatancy i.e. high plastic and apparent viscosity and negative yield values.

Introduction of fine grade materials tends to stablise the flow regime keep it laminar at higher shear rates: plastic viscosity decreases markedly and yield point changes from negative to positive. No significant increase in low-shear rate viscosity (@3 rpm) is caused by the colloidal barite.

These results show that the colloidal weight material of this invention may advantageously be used in conjunction with conventional API barite.

EXAMPLE 4

An eighteen (18) pound per gallon [2.15 g/cm$^3$] slurry of weighting agent according the present invention was formulated and subsequently contaminated with a range of common contaminants and hot rolled at 300° F. (148.9° C.). The rheological results of before (BHR) and after hot rolling (AHR) are presented below. The system shows excellent resistance to contaminants, low controllable rheology and gives fluid loss control under a standard API mud test as shown in following table VI: An equivalent set of fluids were prepared using API conventional barite without the polymer coating as a direct comparison of the two particle types. (Table VII)

TABLE VI

| | (New barite) | | | | | | | | |
|---|---|---|---|---|---|---|---|---|---|
| | Viscosity (Fann Units) at various shear rates (rpm of agitation): | | | | | | PV | YP lb/100 ft$^2$ | Fluid loss |
| | 600 | 300 | 200 | 100 | 6 | 3 | mPa.s | (Pascals) | ml |
| no contaminant BHR | 21 | 11 | 8 | 4 | 1 | 1 | 10 | 1(0.5) | |
| no contaminant AHR | 18 | 10 | 7 | 4 | 1 | 1 | 8 | 2(1) | 5.0 |
| +80 ppb NaCl BHR | 41 | 23 | 16 | 10 | 2 | 1 | 18 | 5(2.5) | |
| +80 ppb NaCl AHR | 26 | 14 | 10 | 6 | 1 | 1 | 12 | 2(1) | 16 |
| +30 ppb OCMA[1] BHR | 38 | 22 | 15 | 9 | 2 | 1 | 16 | 6(3) | |
| +30 ppb OCMA AHR | 26 | 14 | 10 | 6 | 1 | 1 | 12 | 2(1) | 6.8 |
| +5 ppb Lime BHR | 15 | 7 | 5 | 3 | 1 | 1 | 8 | −1(−0.5) | |
| +5 ppb Lime AHR | 10 | 5 | 4 | 2 | 1 | 1 | 5 | 0 | 6.4 |

[1]OCHMA = Ocma clay, a fine particle ball clay commonly used to replicate drilled solids contamination

TABLE VII

| | (Conventional API Barite) | | | | | | | | |
|---|---|---|---|---|---|---|---|---|---|
| | Viscosity (Fann Units) at various shear rates (rpm of agitation): | | | | | | PV | YP lb/100 ft² | Fluid loss |
| | 600 | 300 | 200 | 100 | 6 | 3 | mPa.s | (Pascals) | ml |
| no contaminant BHR | 22 | 10 | 6 | 3 | 1 | 1 | 12 | −2 | |
| no contaminant AHR | 40 | 24 | 19 | 11 | 5 | 4 | 16 | 8 | Total[1] |
| +80 ppb NaCl BHR | 27 | 13 | 10 | 6 | 2 | 1 | 14 | −1 | |
| +80 ppb NaCl AHR | 25 | 16 | 9 | 8 | 1 | 1 | 9 | 7 | Total[1] |
| +30 ppb OCMA BHR | 69 | 55 | 49 | 43 | 31 | 26 | 14 | 31 | |
| +30 ppb OCMA AHR | 51 | 36 | 31 | 25 | 18 | 16 | 15 | 21 | Total[2] |
| +5 ppb Lime BHR | 26 | 14 | 10 | 6 | 2 | 1 | 12 | 2 | |
| +5 ppb Lime AHR | 26 | 14 | 10 | 6 | 1 | 1 | 12 | 2 | Total[1] |

[1] - Total fluid loss within 30 seconds
[2] - Total fluid loss within 5 minutes.

A comparison of the two sets of data show that the weighting agent according the present invention has considerable fluid loss control properties when compared to the API barite. The API barite also shows sensitivity to drilled solids contamination whereas the new barite system is more tolerant.

EXAMPLE 5

An experiment was conducted to demonstrate the ability of the new weighting agent to formulate drilling muds with densities above 20 pound per gallon [2.39 g/cm³].

Two twenty two pound per gallon [2.63 g/cm³] mud systems were formulated, the weighting agents comprised a blend of 35% w/w new barite weighting agent with 65% w/w API grade Barite (Fluid #1) weighting agent and 100% API grade barite (fluid #2), both with 11.5 pound per barrel [32.8 kg/m³] STAPLEX 500 (mark of Schlumberger, shale stabiliser), 2 pound per barrel [5.7 kg/m³] IDCAP (mark of Schlumberger, shale inhibitor), and 3.5 pound per barrel [10 kg/m³] KCl. The other additives provide inhibition to the drilling fluid, but here demonstrate the capacity of the new formulation to cope with any subsequent polymer additions. The fluid was hot rolled to 200° F. (93.3° C.). Results are provided in table VIII.

The 100% API grade barite has very high plastic viscosity and is in fact turbulent as demonstrated by the negative yield point, after hot rolling the rheology is so high it is off scale.

EXAMPLE 6

This experiment demonstrates the ability of the new weighting agent to low viscosity fluids. The weighting agent is 100% colloidal barite according the present invention. Fluid #15 is based on a pseudo-oil (Ultidrill, Mark of Schlumberger, a linear alpha-olefin having 14 to 16 carbon atoms). Fluid #16 is a water-based mud and includes a viscosifier (0.5 ppb IDVIS, Mark of Schlumberger, a pure xanthan gum polymer) and a fluid loss control agent (6.6 ppb IDFLO Mark of Schlumberger). Fluid #15 was hot rolled at 200° F. (93.3° C.), fluid #16 at 250° F. (121.1° C.). After hot rolling results are shown table IX.

TABLE VIII

| | Viscosity (Fann Units) at various shear rates (rpm of agitation): | | | | | | PV | Yield Point lb/100 ft² | Fluid loss |
|---|---|---|---|---|---|---|---|---|---|
| | 600 | 300 | 200 | 100 | 6 | 3 | mPa.s | (Pascals) | ml |
| Before Hot Rolling (#1) | 10 | 58 | 46 | 30 | 9 | 8 | 52 | 6 (2.9) | |
| After Hot Rolling (#1) | 123 | 70 | 52 | 30 | 9 | 8 | 53 | 17 (8.1) | 8.0 |
| Before Hot Rolling (#2) | 270 | 103 | 55 | 23 | 3 | 2 | 167 | −64 (−32) | |
| After Hot rolling (#2) | os | 177 | 110 | 47 | 7 | 5 | | | 12.0 | os : off-scale

TABLE IX

| | Viscosity (Fann Units) at various shear rates (rpm of agitation): | | | | | | PV | Gels[1] lbs/100 ft$^2$ | Yield Point lbs/100 ft$^2$ |
|---|---|---|---|---|---|---|---|---|---|
| | 600 | 300 | 200 | 100 | 6 | 3 | mPa.s | (Pascals) | (Pascals) |
| #15 : 13.66 ppg [1.63 g/cm$^3$] | 39 | 27 | 23 | 17 | 6 | 5 | 12 | 7/11 | 15 |
| #16 : 14 ppg [1.67 g/cm$^3$] | 53 | 36 | 27 | 17 | 6 | 5 | 17 | 5/— | 19 |

[1]A measure of the gelling and suspending characteristics of the fluid, determined at 10 sec/10 min using a Fann viscosimeter.

Even though the formulation was not optimized, this test makes clear that the new weighting agent provides a way to formulate brine analogues fluids useful for slimhole applications or coiled tubing drilling fluids. The rheology profile is improved by the addition of colloidal particles.

EXAMPLE 7

An experiment was conducted to demonstrate the ability of the new weighting agent to formulate completion fluids, were density control and hence sedimentation stability is a prime factor. The weighting agent is composed of the new colloidal barite according to the present invention with 50 pound per barrel [142.65 kg/m$^2$] standard API grade calcium carbonate which acts as bridging solids. The 18.6 ppg [2.23 g/cm$^3$] fluid was formulated with 2 pound per barrel [5.7 kg/m$^3$] PTS 200 (mark of Schlumberger, pH buffer) The static ageing tests were carried out at 400° F. (204.4° C.) for 72 hours. The results shown in the table below, before (BSA) and after (ASA) static ageing reveal good stability to sedimentation and rheological profile.

| | Viscosity (Fann Units) at various shear rates (rpm of agitation): | | | | | | PV | YP lb/100 ft$^2$ | Free water * |
|---|---|---|---|---|---|---|---|---|---|
| | 600 | 300 | 200 | 100 | 6 | 3 | mPa.s | (Pascals) | ml |
| 18.6 ppg BSA | 37 | 21 | 15 | 11 | 2 | 1 | 16 | 5 (2.5) | — |
| 18.6 ppg ASA | 27 | 14 | 11 | 6 | 1 | 1 | 13 | 1 (0.5) | 6 |

* free water is the volume of clear water that appears on top of the fluid. The remainder of the fluid has uniform density.

EXAMPLE 8

The experiment demonstrates the ability of the new weighting agent to formulate low viscosity fluids and show it's tolerance to pH variations. The weighting agent is composed of the new colloidal barite according to the present invention. The 16 ppg [1.91 g/cm$^3$] fluid was formulated with caustic soda to adjust the pH to the required level, with the subsequent fluid rheology and API filtration tested. The results shown in the table below reveal good stability to pH variation and rheological profile.

| | Viscosity (Fann Units) at various shear rates (rpm of agitation): | | | | | | PV | Yield Point lbs/100 ft$^2$ | Fluid Loss |
|---|---|---|---|---|---|---|---|---|---|
| PH | 600 | 300 | 200 | 100 | 6 | 3 | mPa.s | (Pascals) | ml |
| 8.01 | 14 | 7 | 5 | 3 | | | 7 | 0 (0) | 8.4 |
| 9.03 | 14 | 8 | 5 | 3 | | | 6 | 2 (1) | 8.5 |
| 10.04 | 17 | 9 | 6 | 3 | | | 8 | 1 (0.5) | 7.9 |
| 10.97 | 17 | 9 | 6 | 3 | | | 8 | 1 (0.5) | 7.9 |
| 12.04 | 19 | 10 | 7 | 4 | 1 | 1 | 9 | 1 (0.5) | 8.1 |

EXAMPLE 9

This experiment demonstrates the ability of the new weighting agent to formulate low rheology HTHP water base fluids. The weighting agent is composed of the new colloidal barite according to the present invention, with 10 pounds per barrel [28.53 kg/m$^3$] CALOTEMP (mark of Schlumberger, fluid loss additive) and 1 pound per barrel [2.85 kg/m$^3$] PTS 200 (mark of Schlumberger, pH buffer). The 17 ppg [2.04 g/cm$^3$] and 18 ppg [2.16 g/cm$^3$] fluids were static aged for 72 hours at 250° F. (121° C.). The results shown in the table below reveal good stability to sedimentation and low rheological profile with the subsequent filtration tested.

| Density | | Viscosity (Fann Units) at various shear rates (rpm of agitation): | | | | | | PV | Yield Point lbs/100 ft$^2$ | Free Water | Fluid Loss |
|---|---|---|---|---|---|---|---|---|---|---|---|
| ppg | PH | 600 | 300 | 200 | 100 | 6 | 3 | mPa.s | (Pascals) | ml | ml |
| 17 | 7.4 | 28 | 16 | 11 | 6 | 1 | 1 | 12 | 4 (2) | 10 | 3.1 |
| 18 | 7.5 | 42 | 23 | 16 | 10 | 1 | 1 | 19 | 4 (2) | 6 | 3.4 |

What is claimed is:

1. An additive composition comprising solid colloidal particles of weight average particle diameter ($d_{50}$) of less than 2 μm but not more than 5% of the particles are less than 0.1 μm in diameter, and a dispersant in an amount sufficient to disperse the particles in a wellbore fluid further comprising a liquid medium in which the liquid medium comprises an organic liquid.

2. A wellbore fluid composition comprising an additive for increasing the density of a fluid, said additive prepared by comminuting a solid material to solid colloidal particles of weight average particle diameter ($d_{50}$) of less than 2 μm but not more than 5% of the particles are less than 0.1 μm in diameter, in the presence of a dispersant, which is prepared by adding the additive in a liquid medium to a wellbore fluid, in which the liquid medium is an organic liquid of kinematic viscosity less than 10 centistokes (10 mm$^2$/s) at 40° C. and of flash point of greater than 60° C.

3. An additive composition comprising solid colloidal particles of weight average particle diameter ($d_{50}$) of less than 2 μm but not more than 5% of the particles are less than 0.1 μm in diameter, a dispersant in an amount sufficient to disperse the particles in a wellbore fluid, and an organic liquid medium.

4. An additive for increasing the density of a wellbore fluid, said additive consisting essentially of solid colloidal particles of weight average particle diameter ($d_{50}$) of less than 2 μm but not more than 5% of the particles are less than 0.1 μm in diameter, and a dispersant, the particles being dispersed in the fluid by the action of said dispersant present in an amount sufficient to disperse the particles.

5. A method of preparing a wellbore fluid composition comprising providing a wellbore fluid; adding to the wellbore fluid a liquid medium consisting essentially of solid colloidal particles of weight average particle diameter ($d_{50}$) of less than 2 μm but not more than 5% of the particles are less than 0.1 μm in diameter, and a dispersant, and dispersing the solid colloidal particles in the wellbore fluid wherein dispersant is selected from carboxylic acids of molecular weight of at least 150, polybasic fatty acids, alkylbenzene sulphonic acids, alkane sulphonic acids, linear alpha-olefin sulphonic acid or the alkaline earth metal salts of any of the above acids, and phospholipids.

6. The method of claim 5 wherein the carboxylic acid is oleic acid.

* * * * *